US008737546B2

(12) United States Patent
Zhengang et al.

(10) Patent No.: US 8,737,546 B2
(45) Date of Patent: May 27, 2014

(54) CHANNEL ESTIMATION TECHNIQUES FOR OFDM

(75) Inventors: Pan Zhengang, Hong Kong (CN); Man Wai Kwan, Hong Kong (CN); Yiqing Zhou, Hong Kong (CN); Tao Li, Fanling (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 809 days.

(21) Appl. No.: 12/428,670

(22) Filed: Apr. 23, 2009

(65) Prior Publication Data

US 2010/0272194 A1 Oct. 28, 2010

(51) Int. Cl.
*H04B 1/10* (2006.01)
(52) U.S. Cl.
USPC .......................... 375/346; 375/260; 375/340
(58) Field of Classification Search
USPC .................. 375/260, 285, 316, 346
See application file for complete search history.

(56) References Cited

U.S. PATENT DOCUMENTS

| 6,654,429 | B1* | 11/2003 | Li ................................. 375/316 |
| 2006/0072652 | A1* | 4/2006 | Kent et al. ..................... 375/148 |
| 2007/0076804 | A1* | 4/2007 | Sestok et al. .................. 375/260 |
| 2007/0147533 | A1* | 6/2007 | Thomas et al. ............... 375/267 |
| 2007/0242761 | A1 | 10/2007 | Yang |
| 2008/0049598 | A1 | 2/2008 | Ma et al. |
| 2009/0245333 | A1* | 10/2009 | Krishnamoorthi et al. ... 375/219 |

FOREIGN PATENT DOCUMENTS

GB 2417403 A 2/2006

* cited by examiner

*Primary Examiner* — Shuwang Liu
*Assistant Examiner* — David Huang
(74) *Attorney, Agent, or Firm* — Fulbright & Jaworski LLP

(57) ABSTRACT

An Orthogonal Frequency Division Multiplexing (OFDM) receiver comprises: a channel estimator receiving a signal that includes a plurality of symbols, each of the symbols including a plurality of pilots and a plurality of data subcarriers, wherein each symbol further includes at least one pilot subcarrier, the estimator using a first channel response estimate of the at least one pilot subcarrier in a first symbol to select a first weight matrix from a plurality of pre-generated weight matrices, and generating channel estimation information for data subcarriers in the first symbol using the selected first weight matrix.

26 Claims, 9 Drawing Sheets

CHANNEL ESTIMATION TECHNIQUES FOR OFDM

TECHNICAL FIELD

The present description is related, generally, to Orthogonal Frequency Division Multiplexing (OFDM) systems and, more specifically, to OFDM receivers generating channel estimation information.

BACKGROUND

Orthogonal Frequency Division Multiplexing (OFDM) systems transmit multiple subcarriers at the same time using a multitude of frequencies. An example OFDM signal is shown in FIG. 1, including data subcarriers and pilot subcarriers. FIG. 1 shows a frequency axis and a time axis, and the subcarriers (both pilot and data subcarriers) with the same time index together make up a symbol.

When an OFDM signal is transmitted and then received by a receiver, the received signal is somewhat different from the transmitted signal, as shown in Equation 1, where y(t,k) is the received subcarrier symbol, x(t,k) is the transmitted subcarrier symbol, H(t,k) is the channel frequency response of the subcarrier symbol, and n(t,k) is noise. The channel frequency response is given by Equation 2. Thus, discounting issues of noise, the transmitted signal can be known if the channel frequency response is also known. OFDM receivers typically calculate channel frequency response (also called "channel estimation") in order to get the transmitted subcarriers before demodulation is performed.

$$y(t,k)=x(t,k)\times H(t,k)+n(t,k) \quad \text{Equation 1}$$

$$H(t,f)=\int h(t,\tau)e^{-j2\pi f\tau}d\tau \quad \text{Equation 2}$$

OFDM signals typically have subcarriers with known properties to assist in calculating channel frequency response. One example is training symbols, as used in bursty transmissions, such as in IEEE 802.11a/g. Another approach is to use pilot subcarriers distributed throughout the signal, as in WiMax, Digital Video Broadcasting (DVB) and others. For instance, FIG. 1 includes pilot subcarriers. Pilots are also referred to as known tones because x(t,k) is known for a given pilot, and the known x(t,k) can be used to calculate the channel frequency response for the given pilot, as in Equation 3.

$$\hat{H}(t,k)=y(t,k)/x(t,k) \quad \text{Equation 3}$$

DVB uses two kinds of pilots. First, there are scatter pilots, where one pilot tone is used every twelve tones in the frequency domain. The positions are cyclically shifted by three subcarriers every adjacent OFDM symbol. The other kinds of pilots are continual pilots, where certain tones (with indices of 0, 48, 54, 87, ..., 1704, ..., 6816) of every OFDM symbol are known.

In DVB, scatter pilots are used to calculate the channel frequency response for the data subcarriers in the signal. The channel frequency response at scatter pilot positions are estimated by a least square (LS) method, i.e., using Equation 3. The channel frequency response of data subcarriers are further estimated from these obtained LS estimations of the pilots. There are currently many techniques in use to estimate the channel frequency response of data subcarriers from that of pilots.

One technique to estimate the channel frequency response of a data subcarrier from a pilot subcarrier is piecewise linear interpolation and higher order polynomial fitting. Such technique ignores the noise effect, and does not need channel statistic information. It provides low to moderate complexity and performance.

Another technique is the transform domain method. The transform domain method needs channel statistic information (Signal to Noise Ratio, time and frequency domain correlation) and uses Fast Fourier Transform (FFT) and Inverse FFT/IFFT calculations. The transform domain method has a moderate to high complexity and performance.

Yet another technique is the Minimum Mean Square Error (MMSE) method, which typically uses channel statistic information and has moderate complexity and high performance. Conventional MMSE methods are one-dimensional (1-D), either in the time or frequency domain. A 1-D MMSE method looks only to pilots with the same frequency or time index as the data subcarrier which is being estimated. Some MMSE methods use both a 1-D time domain estimation and a 1-D frequency domain estimation (also called a sequential 1-D method) but are not truly two-dimensional (2-D) because pilots with different frequency and time indices from the data subcarrier being estimated are not able to be used in the estimation. However, true 2-D MMSE estimation has been described to some extent in the prior art. Currently available MMSE methods fail to strike an adequate balance between efficiency and accuracy by performing needless recalculating and/or performing estimation using more pilots than is necessary.

BRIEF SUMMARY

Various embodiments of the invention are directed to systems, methods, and computer program products providing efficient techniques to estimate channel frequency responses within OFDM applications. In one specific example, a signal is divided into a plurality of windows (e.g., each window is five subcarriers in length in the time dimension and twenty-five subcarriers in length in the frequency dimension). Furthermore, two or more weight matrices are pre-calculated, and each of the weight matrices corresponds to a profile of signal conditions (e.g., a first weight matrix corresponding to a large delay spread and slow fading rate and a second weight matrix corresponding to a small delay spread and a fast fading rate).

Continuing with this example, within a window, MMSE channel frequency response estimates are made for continual pilot subcarriers in a portion of the window, wherein the estimates are made using each pre-calculated weight matrix. The channel frequency responses of the continual pilot subcarriers are known (typically by using an LS algorithm). For each MMSE estimate, a Square Error (SE) is calculated using the known response and recorded. The window slides in the frequency domain to another position, where more estimations are made and SEs are recorded. The process is repeated until the end of the frequency band is reached, and MSE is calculated over the recorded set of SEs. MSE is an average of the mismatch (SE) between two groups of values. The MSEs over the whole band are compared, and the MMSE estimate that has the lowest MSE is assumed to be more representative of the true channel condition, and the weight matrix corresponding to the closest MMSE estimate is selected and used to estimate the channel frequency response of data subcarriers within a symbol.

Choosing from a limited set of pre-generated weight matrices can help to reduce or eliminate the complex and expensive recalculation of weight matrices that is a characteristic of some prior art techniques. Thus, one advantage of some embodiments is decreased complexity and cost. Various embodiments of the invention can be applied to 1-D and 2-D MMSE techniques for frequency response estimation.

Various embodiments focus on how to use known distributed pilots to estimate the channel response by employing the LS channel frequency response at the pilot tone locations to estimate the channel frequency response at the data tone locations directly. In other words, this example eliminates the use of the transform domain method where the channel frequency response of pilot tones are first converted to time domain (Channel Impulse Response, CIR), and then converted back to frequency domain after certain processing. The direct channel frequency response to channel frequency response technique of this example employs a weighted summation process—i.e., the channel frequency response of data tones is a weighted summation of a group of channel frequency responses at pilot locations.

When using various embodiments of the invention, certain factors may be taken into account. For instance, the number of pilots used in the estimations can be determined beforehand. Typically, using more pilots yields more accuracy but adds computational complexity. Furthermore, the pilots used in the estimations can be selected from the same time index, the same frequency index, different time and/or frequency indices, so that 1-D and 2-D methods are within the scope of embodiments. The sequential 1-D method in most cases will give almost the same performance as a true 2-D method. However, a sequential 1-D method should follow an order in analyzing the time and frequency domains. For example, in a slow fading channel, it is preferred that the time domain is analyzed first. In a fast fading channel, it is preferred that the frequency domain is analyzed first. By contrast, in a true 2-D method, the order information has already been included in the weighting factors.

The weight vector with MMSE criteria is different under different channel profiles. It will approach the best performance when the assumed channel profile matches with the real-time experienced channel profile. Various embodiments obtain the MMSE weight vector for a real-time experienced channel profile by using pre-calculated weight vectors for a set of well-defined channel profiles. The pre-calculated weight vectors are used in a competition algorithm based on the MSE of the MMSE channel frequency response and the known (e.g., LS) channel frequency response at continual pilot locations, where the set of continual pilots of one single OFDM symbol is used to calculate the MSE. The pre-calculated weight vectors compete once every OFDM symbol, and the winner is used to estimate the channel for one OFDM symbol.

The example above gives one way to determine a weight vector through a competition algorithm, and other techniques exist within the scope of embodiments. Weight vectors can compete with each other in many scales, for example, one or several windows, one whole OFDM symbol, or one overall frame. There are some practical considerations. A smaller scale for competing may introduce unneeded comparison calculations, whereas a very large scale (e.g., over the whole frame) may introduce large delay effect and large buffer requirement. A scale encompassing one OFDM symbol has been shown by simulation to be reasonable and consistent with the receiver chain signal processing.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
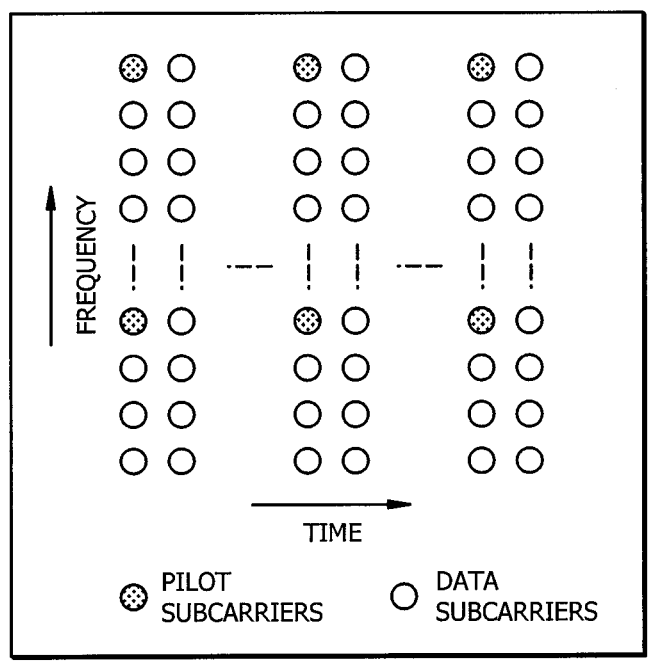
FIG. 1 is an illustration of an example OFDM signal.
Figure 2:
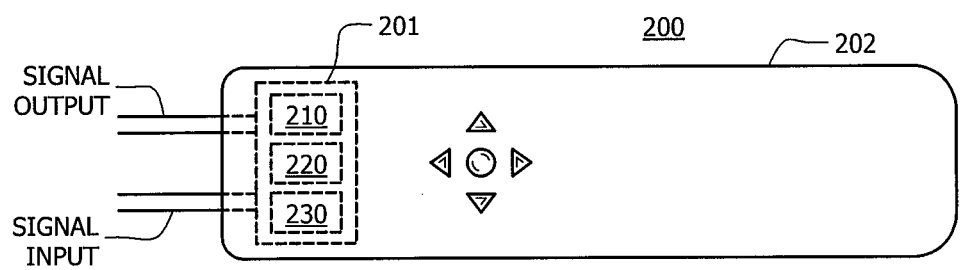
FIG. 2 is an illustration of an exemplary system adapted according to one embodiment of the invention.

FIG. 2 is an illustration of exemplary system 200 adapted according to one embodiment of the invention. System 200 includes OFDM receiver 201, which in this embodiment is part of digital television receiver 202. OFDM receiver 201 is not limited to use in television receivers, as other uses are also possible, such as within handheld devices (e.g., cellular phones, Personal Digital Assistants, laptop/desktop computers, and the like).

OFDM receiver 201 receives a signal that includes subcarriers spread across the time and frequency domains. Channel estimator 210 processes the signal and produces channel frequency response estimates therefrom, as described in more detail below. Demodulator 220 uses the channel frequency responses to perform coherent demodulation of the data tones. Demodulator 220 utilizes the received frequency data tones and the frequency channel response to recover the transmitted data symbols (for example, BPSK, QPSK, QAM symbols). The recovered data symbols are then soft-demapped to bit information and further fed into channel decoder 230 for further processing and presentation to a user.

Figure 3:
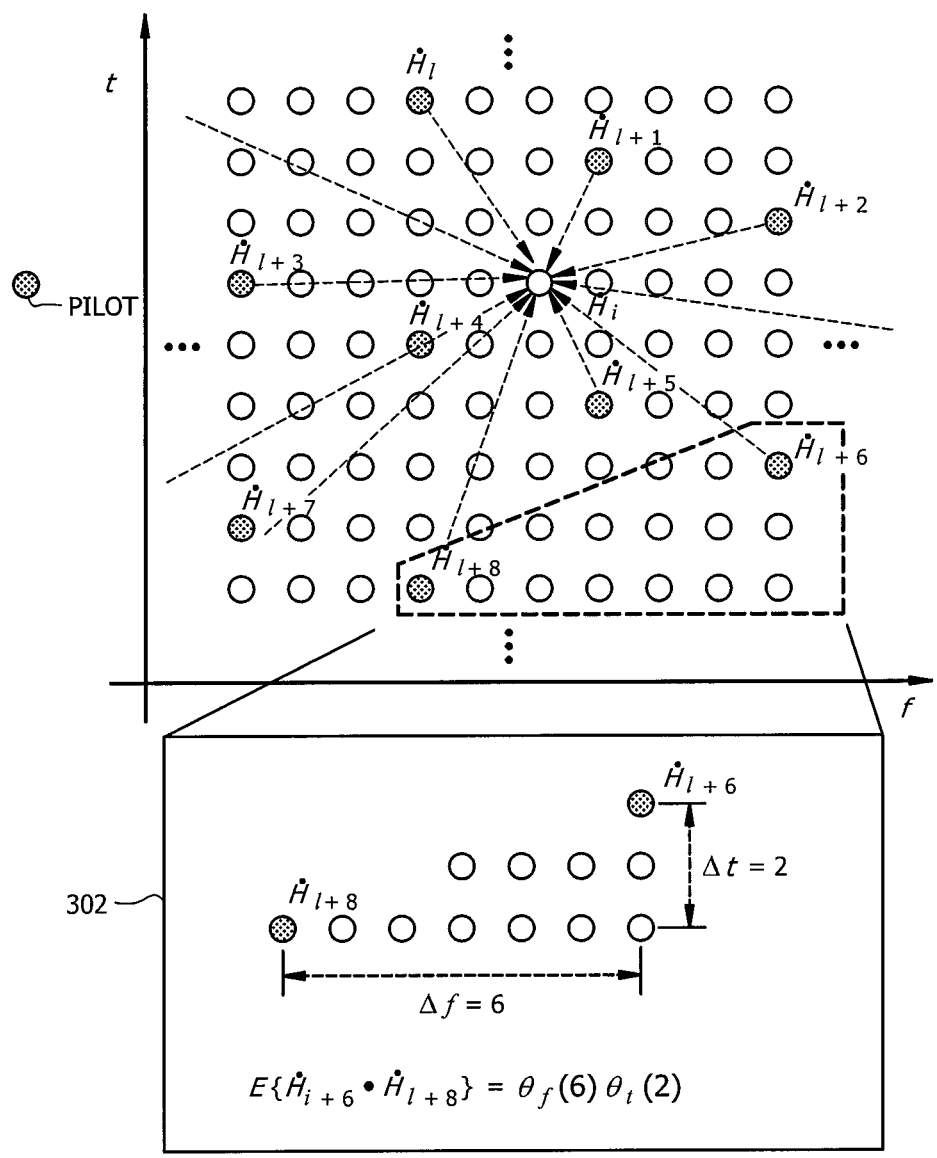
FIG. 3 is an illustration of an exemplary 2-D channel estimation that can be used in various embodiments of the invention.

FIG. 3 is an illustration of an exemplary 2-D channel estimation that can be used in various embodiments of the invention. In this example, the channel frequency response of data subcarrier 301 is being estimated using the pilots in the area, even pilots that do not share either a time or frequency index with data subcarrier 301. Box 302 is an illustration of an exemplary calculation of cross correlation using two pilots. For each data subcarrier, the MMSE channel estimation can be calculated according to Equation 4, where Ḣ is a vector of pilot channel frequency responses, w is a weighting vector that is multiplied by the matrix of pilot channel frequency responses, SNR is the signal to noise ratio, θ is the cross correlation vector, R is the autocorrelation vector, and I is the identity matrix.

$$\tilde{H}_i = w_i \dot{H} = \theta_i \left(\frac{1}{SNR}I + R\right)^{-1} \begin{bmatrix} \vdots \\ \dot{H}_l \\ \vdots \\ \dot{H}_{l+8} \\ \vdots \end{bmatrix}$$   Equation 4

$$\theta_j = E\{H_i \cdot [\ldots, H_l, \ldots, H_{l+8}, \ldots]\}$$   Equation 5

$$R = E \left\{ \begin{bmatrix} \vdots \\ H_l \\ \vdots \\ H_{l+8} \\ \vdots \end{bmatrix} \cdot [\ldots, H_l, \ldots, H_{l+8}, \ldots] \right\}$$   Equation 6

Figure 4:
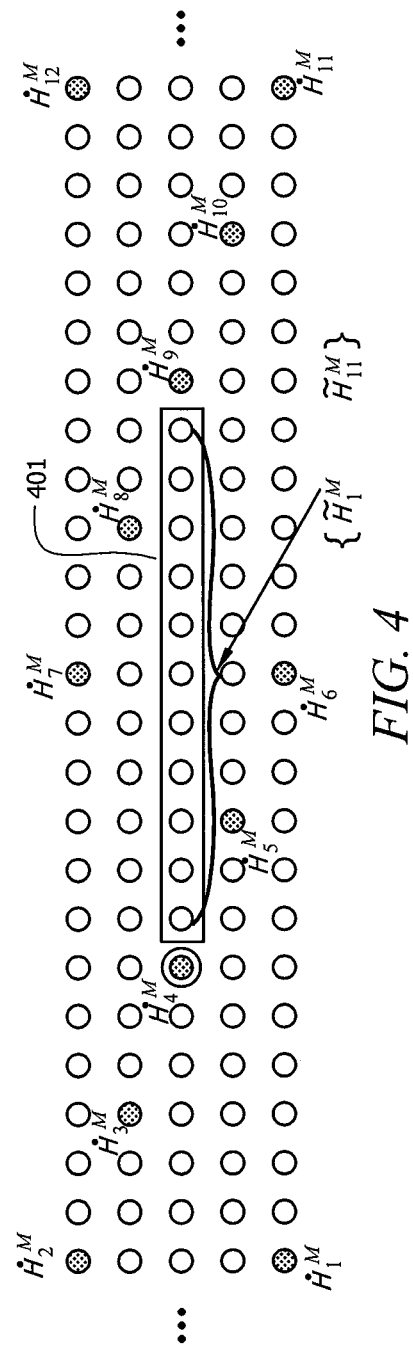
FIG. 4 is an illustration of an exemplary 2-D window that spans five carriers in the time domain and twenty-five carriers in the frequency domain that can be used in various embodiments of the invention.

Various embodiments of the invention define a 2-D window in the OFDM symbol that is used for selecting weight vectors and estimating channel frequency responses for data subcarriers. FIG. 4 is an illustration of exemplary 2-D window 400 that spans five carriers in the time domain and twenty five carriers in the frequency domain.

Window 400 is a subset of the subcarriers in five OFDM symbols, and portion 401 is a subset of a subset. Portion 401 is the subset of data subcarriers for which channel frequency responses will be estimated using window 400, as explained further below. A feature of note of window 400 is that it restricts the number of scatter pilots to twelve for use in estimating the subcarriers of portion 401. Equation 7 shows the calculation of channel estimates for the data subcarriers of portion 401. The matrix W is an eleven by twelve matrix that includes eleven weight vectors w—one for each of the data subcarriers of portion 401, and each of the weight vectors w includes one weight factor for each of the twelve pilots in window 400. Thus, for window 400, eleven 12-length weight vectors are stored in the calculation shown by Equation 7, and twelve multiplication calculations and one addition calculation are used for each of the eleven data subcarriers in portion 400.

$$\tilde{H}^M = \begin{bmatrix} \tilde{H}_1^M \\ \tilde{H}_2^M \\ \vdots \\ \tilde{H}_{11}^M \end{bmatrix} = W\dot{H}^M = \begin{bmatrix} w_1 \\ w_2 \\ \vdots \\ w_{11} \end{bmatrix} \begin{bmatrix} \dot{H}_1^M \\ \dot{H}_2^M \\ \vdots \\ \dot{H}_{12}^M \end{bmatrix}$$   Equation 7

Some embodiments of the invention may be adapted to frames of different sizes and windows of different sizes. A larger sized window that includes more pilots will typically be expected to provide more accurate results at a cost of more calculations. The window of FIG. 4 has been shown by simulation to give results that are acceptable for use in a DVB-T/H application.

The discussion now turns to calculation of the weight matrix W and will return to describing generating channel response estimates for all data subcarriers in the symbols. One of the features of some embodiments of the invention is that weight matrices are selected from a set of pre-generated weight matrices. Such a feature may provide some efficiency in that the cost of recalculating a weight vector for each data subcarrier is reduced or eliminated.

One example technique to pre-generate weighting matrices includes associating them with channel profile assumptions. Additionally, the weighting matrices are created using a known relative position of the data subcarriers and scatter pilots within a pilot subcarrier configuration in a window. As will be explained further below, the pattern of the scattered pilots is the same in each window throughout the frame so that the pre-generated weight matrices are applicable for all symbols in this exemplary signal.

Figure 5:
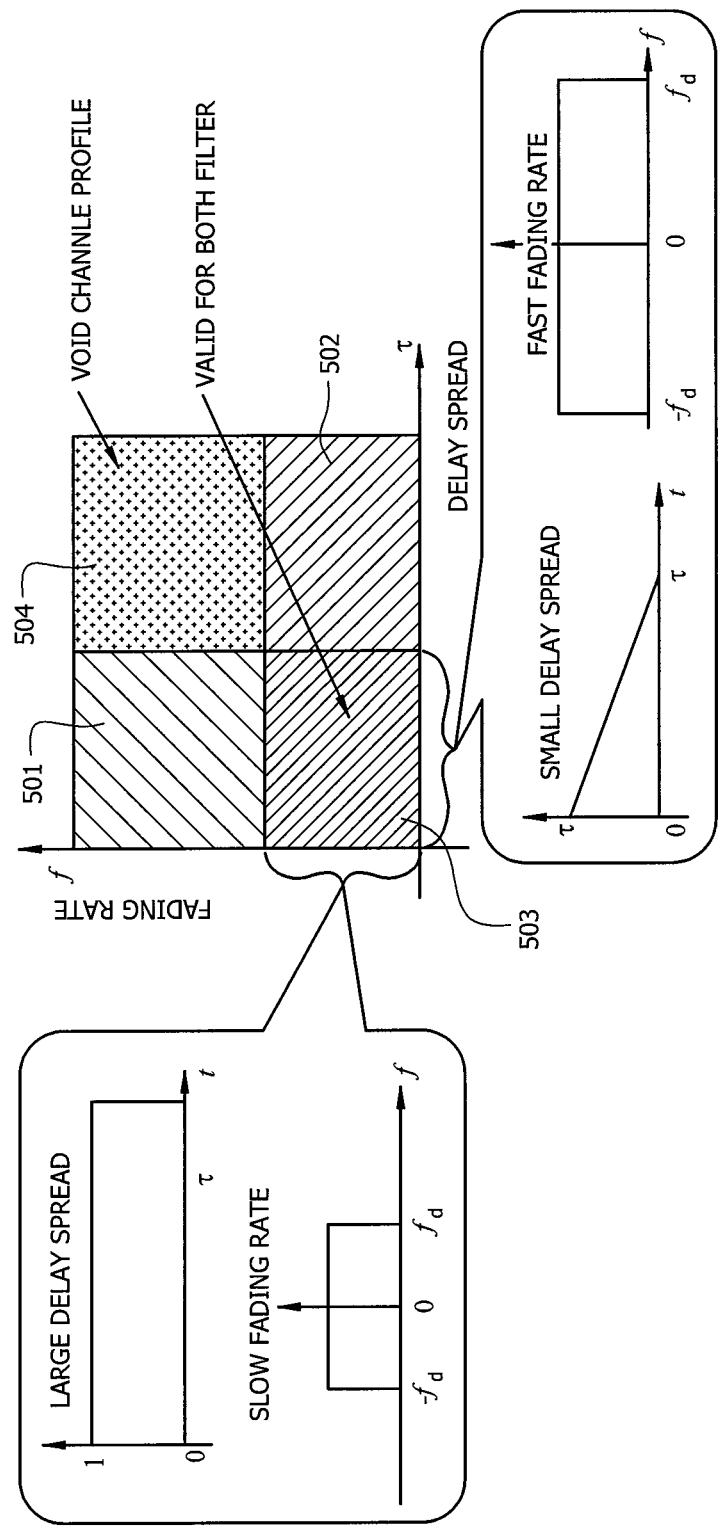
FIG. 5 is an illustration of an exemplary channel profile assumption that can be used in some embodiments of the invention to pre-generate weight vectors for use in the calculations of Equation 7.

In this example embodiment, a reasonable number of weight matrices are used, each one associated with an assumed channel profile, where the set of assumed channel profiles covers substantially all possible real time channel conditions. FIG. 5 is an illustration of an exemplary channel profile assumption that can be used in some embodiments to pre-generate weight matrices for use in the calculations of Equation 7. In the embodiment of FIG. 5, assumptions are made concerning fading rate and delay spread, which are properties associated with cross correlation and autocorrelation of Equations 5 and 6. Quadrant 501 represents a channel profile from zero delay spread to middle delay spread, and from zero fading rate to high fading rate. Quadrant 502 represents a channel profile from zero delay spread to high delay spread, and from zero fading rate to middle fading rate. Quadrant 503 represents a channel profile at the intersection of quadrants 501 and 502. Quadrant 504 represents a channel profile with a fast fading rate and large delay spread. In this example embodiment, one weighting matrix (W1) is associated with the profile of quadrant 501, and another weighting matrix (W2) is associated with the profile of quadrant 502. Both weighting matrices are valid when the channel profile corresponds to quadrant 503, and quadrant 504 is void (i.e., signal quality is too poor to be used).

Figure 6:
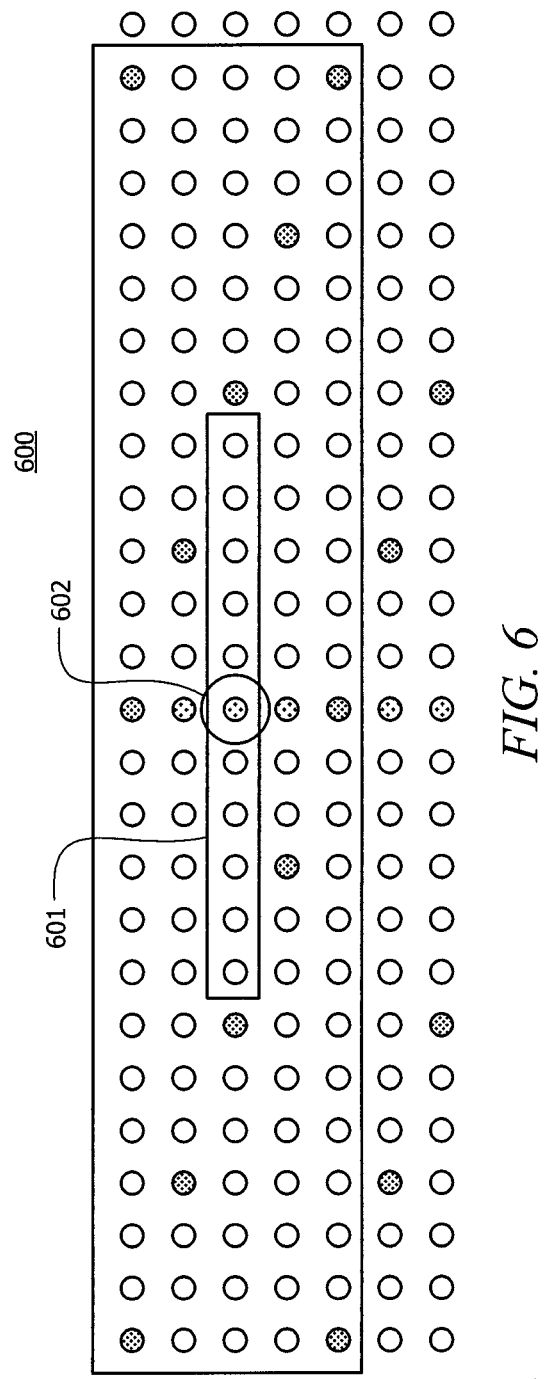
FIG. 6 is an illustration of an exemplary window adapted according to one embodiment of the invention.

FIG. 6 is an illustration of exemplary window 600 adapted according to one embodiment of the invention. Similar to window 400 (FIG. 4), window 600 defines twelve scatter pilots to be used for channel estimation of the data subcarriers of portion 601. FIG. 6 also illustrates continual pilot 602 (one of a group of continual pilots with the same frequency index). In this example, continual pilot 602 is used in a technique for selecting one of the weighting matrices.

As shown above, channel frequency response estimation for a pilot subcarrier is readily calculated using, e.g., an LS method (Equation 3). In this example, the channel frequency response of pilot 602 is estimated using an LS method, and the value is stored. The channel frequency response of pilot 602 is also calculated using an MMSE technique for each of the pre-generated weighting matrices W1 and W2. The window is then moved to a new location, and the calculations are performed again for the continual pilots at the new window location. The process of sliding the window pattern and calculating the MMSE of the continual pilots with the two different matrices is repeated until the whole band is covered. Two sets of MMSE estimations of continual pilots are obtained. The two sets of MMSE estimations are used to calculate the MSE together with the LS estimation. For example, MSE1 and MSE2 represent errors in the first and second sets of MMSE estimations, respectively. If MSE1<MSE2, then W1 is selected. If MSE1>MSE2, W2 is selected. Sometimes, a bias factor (alpha) is used. For example, if MSE1<MSE2*alpha, then W1 is selected. The bias factor alpha can be used to take into account of the noise effect of the LS estimation.

The comparison is illustrated by Equation 8, where J is the set of frequency indices of continual pilots. Equation 8 calculates the average of two sets of SEs within one symbol and compares them. As the scale factor 1/size(J) should typically not affect the comparison results, some embodiments may use accumulation instead of averaging to avoid a division operation. Thus, the example embodiment includes a mechanism to make two or more channel profile assumptions compete, where each of the channel profile assumptions is associated with a different weighting matrix. The best channel profile assumption "wins" the competition, thereby providing a weighting matrix for use with a plurality of data subcarriers in Equation 7.

$\tilde{H}_j^{M1}$: MMSE channel estimations of continual pilots with W1
$\tilde{H}_j^{M2}$: MMSE channel estimations of continual pilots with W2
$\hat{H}_j^{M}$: LS channel estimations of continual pilots $$v^* = \underset{v \in [1,2]}{\operatorname{argmin}} \left\{ \sum_{j \in J} |\tilde{H}_j^{Mv} - \hat{H}_j^{M}|^2 \right\} \quad \text{Equation 8}$$

The embodiment selects the best weighting matrix for use in estimating channel frequency responses of the data subcarriers across the symbol that includes portion 601. After the appropriate weighting matrix is selected, the MMSE channel frequency response estimation for the data tones in the symbol is undertaken. The window pattern slides over the band once again, and the channel frequency responses of the data tones in a symbol (i.e., the symbol encompassing portion 601) are estimated by using the selected "winner" matrix.

Figure 7:
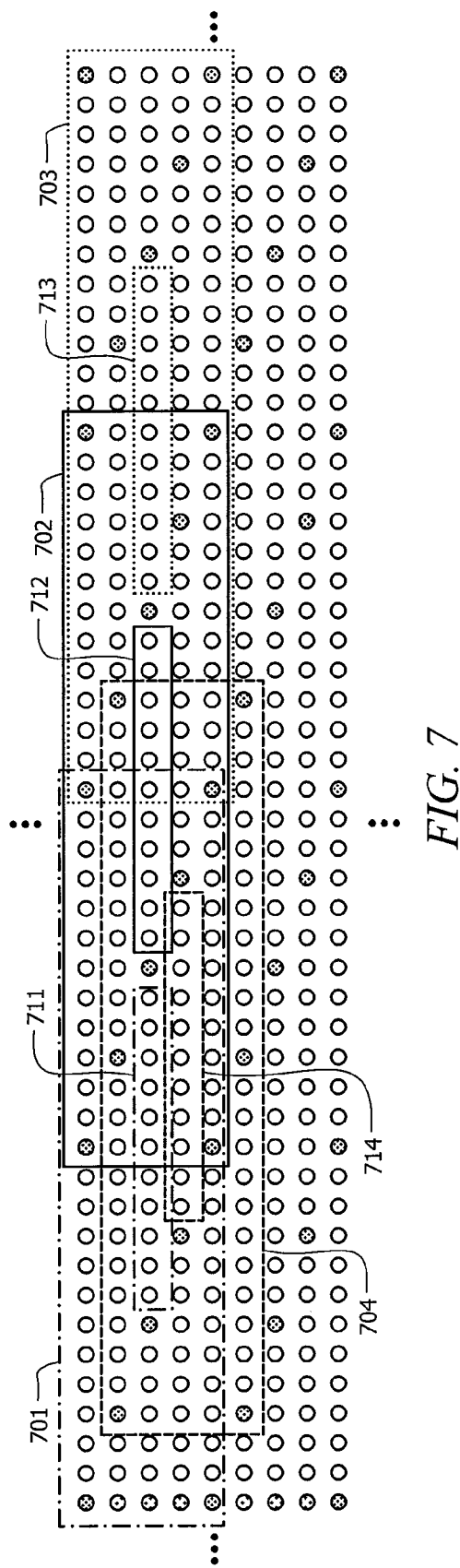
FIG. 7 is an illustration of an exemplary sliding window pattern for use in some embodiments of the invention.

As mentioned above, various embodiments include sliding the window over the frequency domain. FIG. 7 is an illustration of an exemplary sliding window pattern for use in some embodiments of the invention. FIG. 7 shows a plurality of windows 701-704, and it is understood that in this example, uniform windows are defined throughout the frame so that there is a consistent spatial relationship between data subcarriers and scatter pilots from window to window. Each window 701-704 includes a respective subset of subcarriers 711-714. After a weighting matrix has been selected for use in estimating the channel frequency responses of the data subcarriers, the weighting matrix is used for other subsets across the band in a symbol. The sliding window technique is used to estimate the channel frequency responses of the data subcarriers in the symbol (i.e., the symbol encompassing subsets 711-713). In other words, the selected weighting matrix is applied in window 701 to estimate the data subcarriers in portion 711 using the scatter pilots within window 701. The same process is applied to windows 702, 703, and other windows (not shown) throughout the frequency band. In some embodiments, the weighting matrix can be used for other symbols in the frame, as well (e.g., with subset 714).

It should be noted that not every window includes continual pilots. Such windows are not used in selecting a weighting matrix but are used in estimating the channel frequency responses of the data subcarriers.

Figure 8:
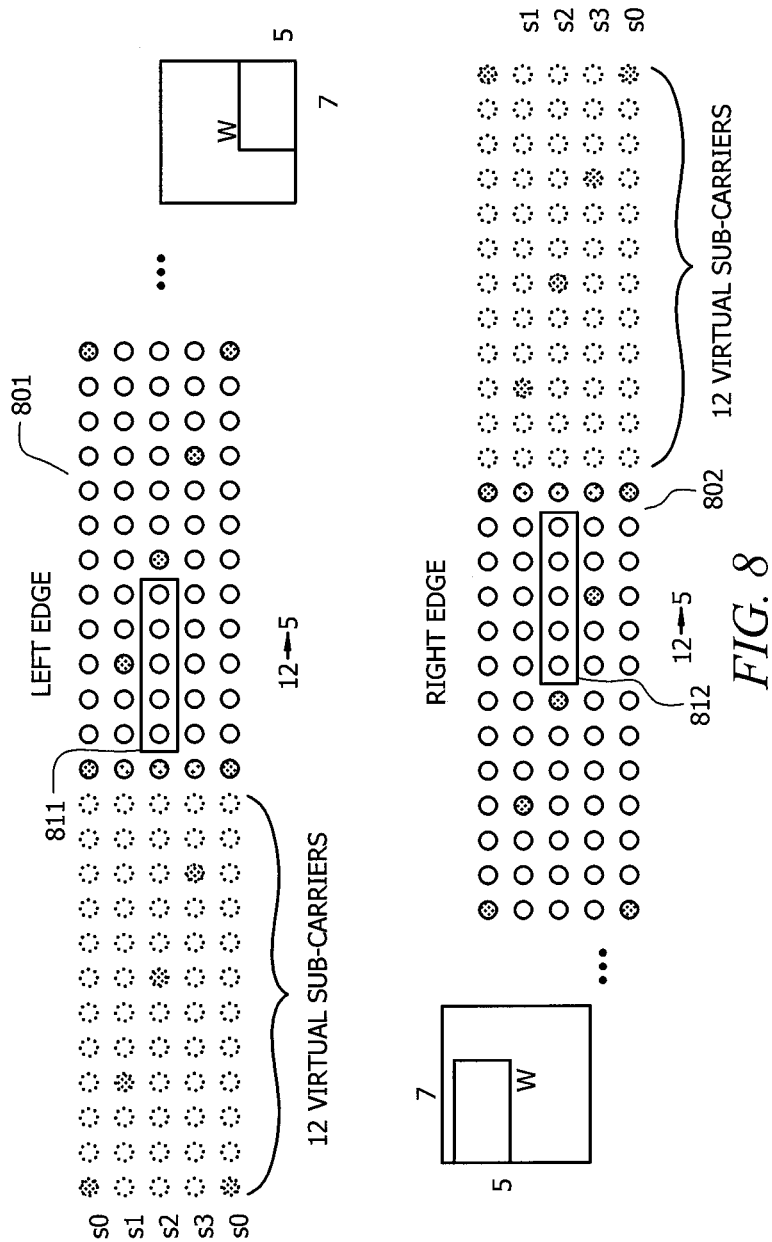
FIG. 8 is an illustration of an exemplary sliding window technique for use at edges of frequency bands, according to one embodiment of the invention.

An adaptation can be used to apply the sliding window technique at edges of the frequency band, as illustrated in FIG. 8. FIG. 8 shows two sliding windows 801 and 802, each illustrating a different edge scenario. Window 801 is at the left edge of a frame, so that both window 801 and subset 811 are cut off. In this case, window 801 is made the same size as other windows in the frame, and virtual subcarriers (including virtual pilots) are used to fill in the created spaces. Window 801 includes twelve virtual subcarriers per symbol. Furthermore, subset 811 includes five virtual subcarriers. In this example, the values of the virtual subcarriers are set to zero, and the estimations of channel frequency responses are performed as in the examples above.

Window 802 is at a right edge of the frequency band in the symbol, but the same concept applies as described with respect to window 801. Once again, virtual subcarriers with values set to zero are inserted as place holders so that the dimensions of window 802 and subset 812 are uniform with other windows and subsets, respectively, in the frame.

Figure 9:
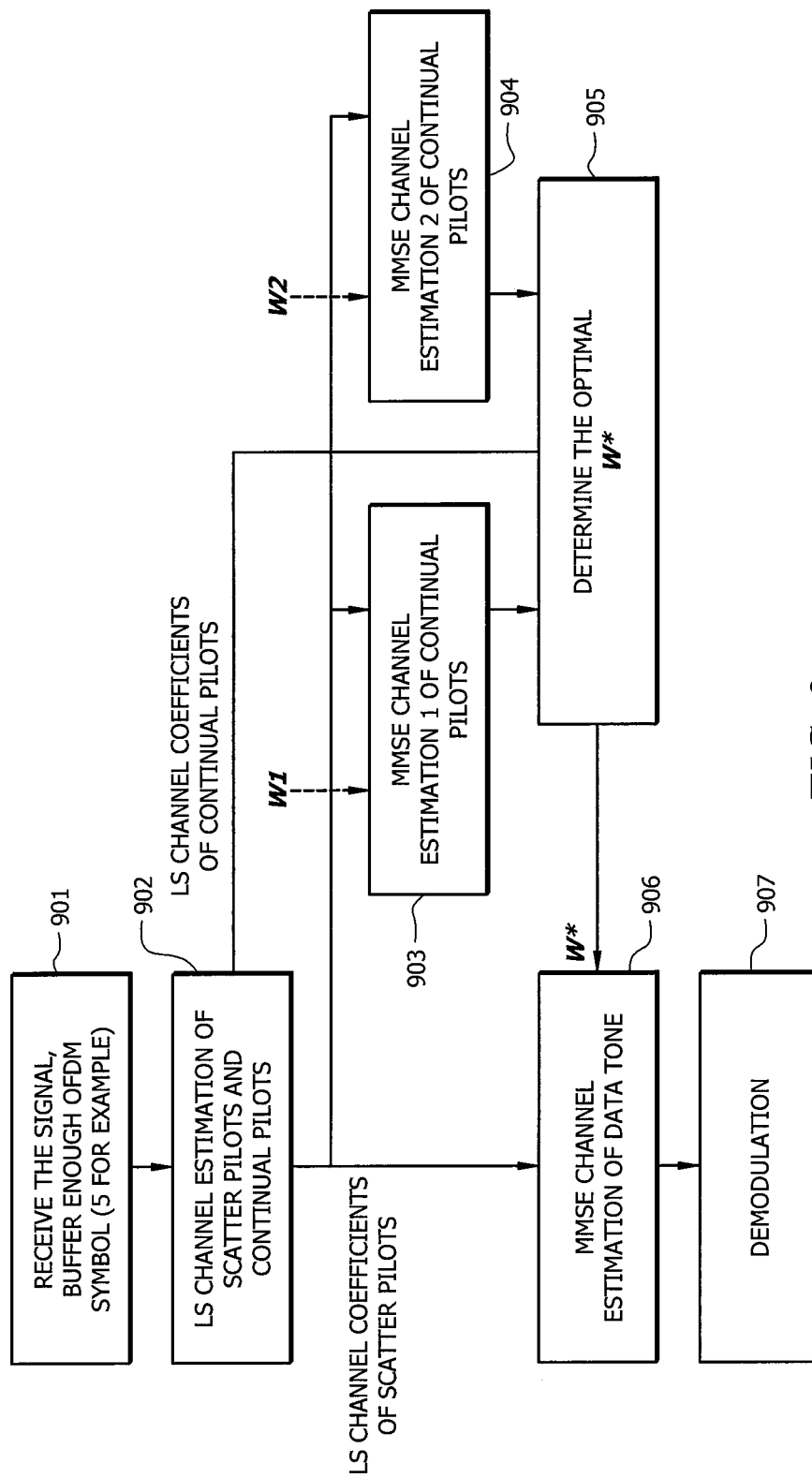
FIG. 9 is an illustration of an exemplary process adapted according to one embodiment of the invention.

Various embodiments include methods of performing techniques according to the examples above. FIG. 9 is an illustration of exemplary process 900 adapted according to one embodiment of the invention. Process 900 may be performed, for example, by an OFDM receiver, such as that shown in FIG. 2.

In block 901, the signal is received, and some symbols are buffered for further processing. In this example, as the window is spanned over five OFDM symbols in the time domain, the system buffers five OFDM symbols, n−4, n−3, n−2, n−1, n. When nth OFDM symbol is received, the system can estimate the channel frequency response for n−2th OFDM symbol. When n+1th OFDM symbol is received, the system can estimate the channel frequency response for n−1th OFDM symbol, and so on. When the nth OFDM symbol is received, as an example, there are five OFDM symbols buffered (i.e., a matrix of tones with 5 rows and 6817 columns in a DVB example). In this example, buffering is a continual process wherein all of the received symbols are buffered before further processing. The signal can be received over the air or over a wire, and buffering is typically performed by computer memory.

In block 902, LS estimation of continual pilots and scatter pilots is performed. The LS channel frequency response at pilot tones (including scatter and continual pilots) is already known in some embodiments, and therefore, is not calculated in block 902. Block 902 yields channel LS frequency response estimations for the pilots.

In blocks 903 and 904, two different MMSE estimations are calculated for continual pilots using two different weighting matrices W1 and W2, each of the weighting matrices corresponding to a different channel profile assumption. The LS channel estimations of the scatter pilots are used in blocks 903 and 904 in the MMSE estimates, as in Equation 7. Other embodiments can use more than two channel profile assumptions. More channel profile assumptions are generally expected to provide greater accuracy, but at a cost of increased calculations and complexity. Simulation has shown that two different weighting vectors corresponding to fading rate and delay spread can be adequate for some DVB applications.

In block 905, the MMSE estimations are compared to the LS calculation of the continual pilots. The calculations corresponding to the first matrix W1 are a first set, and the calculations corresponding to the second matrix W2 are a second set. The set of MMSE calculations that has the lowest MSE with reference to the LS calculations indicates which of the weighting matrix W1 and W2 candidates to select for use in channel estimations of the data subcarriers. In some embodiments, a bias factor is introduced to mitigate the impact of noise.

In block 906, the selected weighting vector (now referred to as W*) is then used to estimate channel frequency responses for data subcarriers. Block 906 may, in some embodiments, include using a sliding window technique to apply the same weighting matrix W* across the spectrum, and even across the time domain, of the frame (or at least a part of the frame).

The channel frequency response estimations of the data subcarriers of the frame are used in demodulation in block 907. The demodulated signal is then transmitted for further processing. For instance, the demodulated signal may be passed to a channel decoder. Process 900 operates to transform an OFDM signal into a demodulated and decoded signal, where the data content can be used to provide user-perceptible information, such as voice from a cellular phone or sound and pictures from a television.

Process 900 is exemplary, and various embodiments may add, omit, modify, and/or rearrange the blocks of process 900. For instance, as mentioned above, a set of more than two different weight matrix candidates can be used for channel estimation of the continual pilots. Furthermore, some embodiments may perform the actions of blocks 903-905 for each symbol, once every several symbols, once per frame, or as often as desired in a particular application. The same set of pre-generated weighting matrix candidates can be used for an entire frame or multiple frames, and in some embodiments, may be set only once and used for all subsequent calculations. While the embodiments above have been described with respect to DVB signals, embodiments can be adapted for use in any of a variety of OFDM applications, such as WiMax, broadband mobile wireless, China Mobile Multimedia Broadcasting standard or other applications that use signals with both scatter pilots and continual pilots. It is contemplated that process 900 is performed in real time so that a human user perceives little or no delay.

Various embodiments of the invention provide advantages over prior art channel estimation techniques. For instance, defining a plurality of uniform windows within a frame and selecting from a reasonable number of weighting matrix candidates can save buffer space and cut down on the number of calculations performed. Table 1 shows an analysis of buffer use and complexity of an embodiment that applies five by twenty-five windows (as in FIG. 4) to a DVB signal, pre-generates a set of two weighting matrix candidates, and selects between the same two pre-generated weighting matrix candidates throughout the frame. Additionally, pre-generating weighting matrix candidates and selecting amongst them can eliminate or greatly reduce reliance on real time matrix inversion and real time channel statistics (e.g., SNR and time/frequency domain correlation). Furthermore, the reduction of buffer use and complexity that is provided by some embodiments can be accompanied by no perceptible loss of performance.

TABLE 1

| Buffer requirements (bits) | Data Channel Weight Matrix | $N \times 3 \times B_d$ $N_{sp} \times 2 \times B_c$ $12 \times 11 \times 2 \times B_m$ | |
|---|---|---|---|
| Computational complexity (per OFDM symbol) | Detection Estimation | Multiplication (complex) Addition (12 elements) Multiplication (complex) Addition (12 elements) | $N_{cp} \times 12$ $N_{cp}$ $N_d \times 12$ $N_d$ |

N: Number of useful subcarriers
$N_d$: Number of data subcarriers
$N_{cp}$: Number of continual pilots
$N_{sp}$: Number of scatter pilots
$B_d$: bit-width for each subcarrier
$B_c$: bit-width for channel estimation
$B_m$: bit-width for complex weight matrix element When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 10:
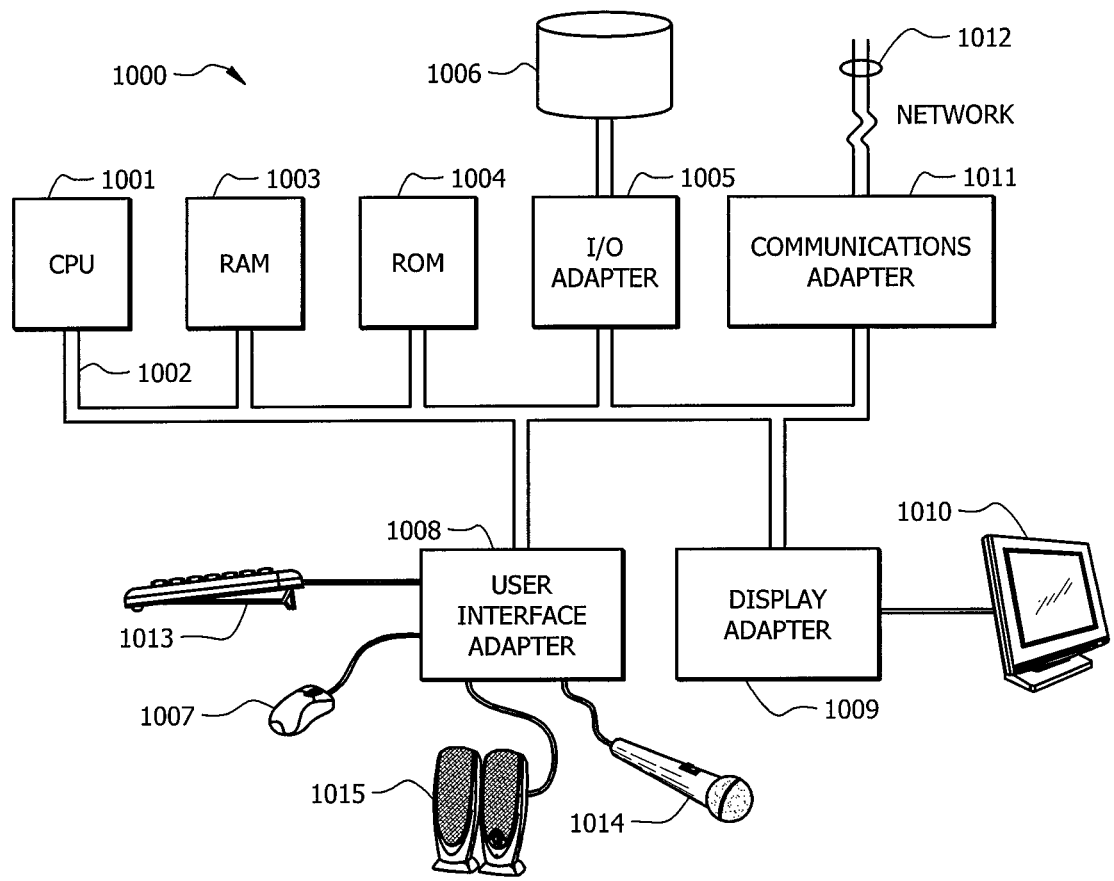
FIG. 10 illustrates an example computer system adapted according to one embodiment of the present invention.

FIG. 10 illustrates an example computer system 1000 adapted according to one embodiment of the present invention. That is, computer system 1000 comprises an example system on which embodiments of the present invention may be implemented (such as TV receiver 202 of the example implementation of FIG. 2 or other device including an OFDM receiver, such as a handheld phone or cellular telephone base station). Central processing unit (CPU) 1001 is coupled to system bus 1002. CPU 1001 may be any general purpose or specialized purpose CPU. However, the present invention is not restricted by the architecture of CPU 1001 as long as CPU 1001 supports the inventive operations as described herein. CPU 1001 may execute the various logical instructions according to embodiments of the present invention. For example, one or more CPUs, such as CPU 1001, may execute machine-level instructions according to the exemplary operational flows described above in conjunction with FIG. 9.

Computer system 1000 also preferably includes random access memory (RAM) 1003, which may be SRAM, DRAM, SDRAM, or the like. In this example, computer system 1000 uses RAM 1003 to buffer 302 of FIG. 3. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 1011, user interface adapter 1008, and display adapter 1009. I/O adapter 1005, user interface adapter 1008, and/or communications adapter 1011 may, in certain embodiments, enable a user to interact with computer system 1000 in order to input information, such as desired television channels, desired phone numbers to dial, information for a text message, etc.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing media data. Communications adapter 1011 is preferably adapted to couple computer system 1000 to network 1012 (e.g., the Internet, a LAN, a cellular network, a cable television network, etc.). User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, display the media as it is played.

Exact configuration of a portion of a system according to various embodiments may be slightly different from that shown above. For instance, embodiments of the present invention may be implemented on application specific integrated circuits (ASICs) or very large scale integrated (VLSI) circuits. Some embodiments may find use in specialized chipsets and/or as software/firmware packages. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An Orthogonal Frequency Division Multiplexing (OFDM) receiver comprising:
   a channel estimator receiving a signal that includes a plurality of symbols, each of the symbols including a plurality of data subcarriers, the estimator generating a first channel response estimate of a symbol of the plurality of symbols on a first set of at least one pilot subcarrier in the signal using a Least Square algorithm, the estimator generating a set of channel response estimates of the symbol using a plurality of pre-generated weight matrices on a second set of at least one pilot subcarrier in the signal, the estimator using the first channel response estimate and the set of channel response estimates to select a weight matrix from the plurality of pre-generated weight matrices, and the estimator generating channel response estimation information for at least a subset of the data subcarriers using the selected weight matrix; and
   a demodulator receiving the channel response estimation information for the at least a subset of the data subcarriers from the channel estimator and using the channel response estimation information for the at least a subset of the data subcarriers to demodulate the received signal.

2. A digital television receiver comprising the OFDM receiver of claim 1.

3. The digital television receiver of claim 2, wherein the OFDM receiver operates according to the Digital Video Broadcasting-Terrestrial (DVB-T) standard.

4. The digital television receiver of claim 2, wherein the OFDM receiver operates according to the Digital Video Broadcasting-Handheld (DVB-H) standard.

5. A cellular telephone base station comprising the OFDM receiver of claim 1.

6. The OFDM receiver of claim 1 wherein the signal is received over the air.

7. The OFDM receiver of claim 1 wherein the signal is received over a wire.

8. The OFDM receiver of claim 1 wherein the plurality of pre-generated weight matrices are generated in accordance with a known relative position of the plurality of data subcarriers within a pilot subcarrier configuration.

9. The OFDM receiver of claim 1 wherein the plurality of pre-generated weight matrices account for potential differences in signal conditions, including at least one of: delay spread and fading rate in the signal.

10. The OFDM receiver of claim 1 wherein the channel estimator uses the selected first weight matrix to make a plurality of channel estimations along a frequency band within a first symbol.

11. The OFDM receiver of claim 1 wherein the channel estimator creates a two-dimensional (2-D) window within the signal, the window containing a first subset of pilot subcarriers from a first subset of the symbols, the channel estimator performing a 2-D channel estimation for the at least a subset of the data subcarriers using the selected weight matrix and channel responses of the first subset of the pilot subcarriers.

12. The OFDM receiver of claim 1 wherein the channel estimator creates a two-dimensional (2-D) window within the signal, the window containing a first subset of pilot subcarriers from a first subset of the symbols; the channel estimator generating additional channel response estimates for the at least one pilot subcarrier within the window using each of the pre-generated weight matrices and the first subset of pilot subcarriers, comparing the additional channel response estimates for each of the pre-generated weight matrices to the first channel response estimate of the at least one pilot subcarrier, and making a selection among the pre-generated weight matrices based upon the comparing.

13. The OFDM receiver of claim 12 wherein the selection is made by choosing one of the pre-generated weight matrices that produces a channel response estimate closest to the first channel response estimate of the at least one pilot subcarrier.

14. The OFDM receiver of claim 13 wherein the channel response estimation information comprises channel frequency response information.

15. The OFDM receiver of claim 1 wherein the generating the set of channel response estimates comprises using a Minimum Mean Square Error algorithm, and wherein using the first channel response estimate and the set of channel response estimates to select a weight matrix from the plurality of pre-generated weight matrices comprises determining a Mean Square error between the first channel response estimate and the set of channel response estimates.

16. A non-transitory computer readable medium having computer program logic recorded thereon for transforming an Orthogonal Frequency Division Multiplexing (OFDM) signal into a demodulated signal, the computer readable medium comprising:
   code for defining a plurality of windows within the OFDM signal, wherein each of the windows includes a plurality of pilots;
   code for storing a plurality of pre-generated weight matrix candidates;
   code for obtaining a first channel response estimate of a symbol using a Least Square algorithm on a first set of the pilots among at least some of the windows;
   code for generating a set of channel response estimates of the symbol by using each of the pre-generated weighting matrix candidates on the first set of the pilots;
   code for selecting a pre-generated weight matrix from the plurality of pre-generated weight matrix candidates, using the first channel response estimate and the set of channel response estimates;

code for using the selected pre-generated weight matrix in estimating channel responses of data subcarriers in the symbol; and code for demodulating the OFDM signal using the estimated channel responses of the data subcarriers in the symbol.

17. The non-transitory computer readable medium of claim 16 wherein the pre-generated weight matrix candidates are associated with channel profile assumptions.

18. The non-transitory computer readable medium of claim 17 wherein the channel profile assumptions comprise:
an assumption about delay spread of the OFDM signal; and
an assumption about fading rate of the signal.

19. The non-transitory computer readable medium of claim 16 wherein the code for using the selected pre-generated weight matrix in estimating channel responses of the data subcarriers in the symbol comprises:
code for generating a two-dimensional (2-D) channel frequency response estimation for the data subcarriers using at least some of the pilots in the plurality of windows.

20. The non-transitory computer readable medium of claim 16 wherein the code for generating the set of channel response estimates comprises code to use a Minimum Mean Square Error algorithm, and wherein the code for selecting a pre-generated weight matrix comprises code to determine a Mean Square error between the first channel response estimate and the set of channel response estimates.

21. A method for demodulating a signal, the method comprising:
receiving a signal;
defining a plurality of windows within the signal, the plurality of windows including a plurality of continual pilot subcarriers;
obtaining a first channel response estimate of a symbol using a Least Square algorithm on the continual pilot subcarriers;
generating a set of channel response estimates of the symbol by using a plurality of weight matrix candidates on the continual pilot subcarriers, each channel response estimate in the set of channel response estimates corresponding to a respective one of the plurality of weight matrix candidates;
comparing the set of channel response estimates to the first channel response estimate;
selecting a weight matrix candidate based on the comparing;
estimating channel responses for data subcarriers in a symbol using the selected weighting matrix candidate; and
demodulating the signal using the estimated channel responses for the data subcarriers.

22. The method of claim 21 wherein the signal comprises:
an Orthogonal Frequency Division Multiplexing (OFDM) signal.

23. The method of claim 21 wherein the signal further includes scatter pilots.

24. The method of claim 21 wherein estimating channel responses for at least a subset of the plurality of data subcarriers comprises:
performing two dimensional channel estimation.

25. The method of claim 21 wherein each of the weight matrix candidates comprises:
a plurality of vectors, each of the vectors corresponding to a respective data subcarrier of at least a subset of the data subcarriers in the symbol;
wherein each of the vectors includes a set of weight values to be applied to pilot subcarriers during channel estimation.

26. The method of claim 21 wherein the generating a set of channel response estimates comprises using a Minimum Mean Square Error algorithm, and wherein the comparing comprises determining a Mean Square error between the first channel response estimate and the set of channel response estimates.

* * * * *

UNITED STATES PATENT AND TRADEMARK OFFICE
CERTIFICATE OF CORRECTION

PATENT NO. : 8,737,546 B2  Page 1 of 1
APPLICATION NO. : 12/428670
DATED : May 27, 2014
INVENTOR(S) : Zhengang It is certified that error appears in the above-identified patent and that said Letters Patent is hereby corrected as shown below:

In the Specification:
    At column 7, line number 34, Equation 8, delete the portion of the equation "$j \in j$" and replace with --$j \in J$--.

In the Claims:
    At column 12, claim number 10, line number 11, delete "selected first weight" and replace with --selected weight--.

Signed and Sealed this
Twelfth Day of August, 2014

Michelle K. Lee
*Deputy Director of the United States Patent and Trademark Office*